Figure 1:
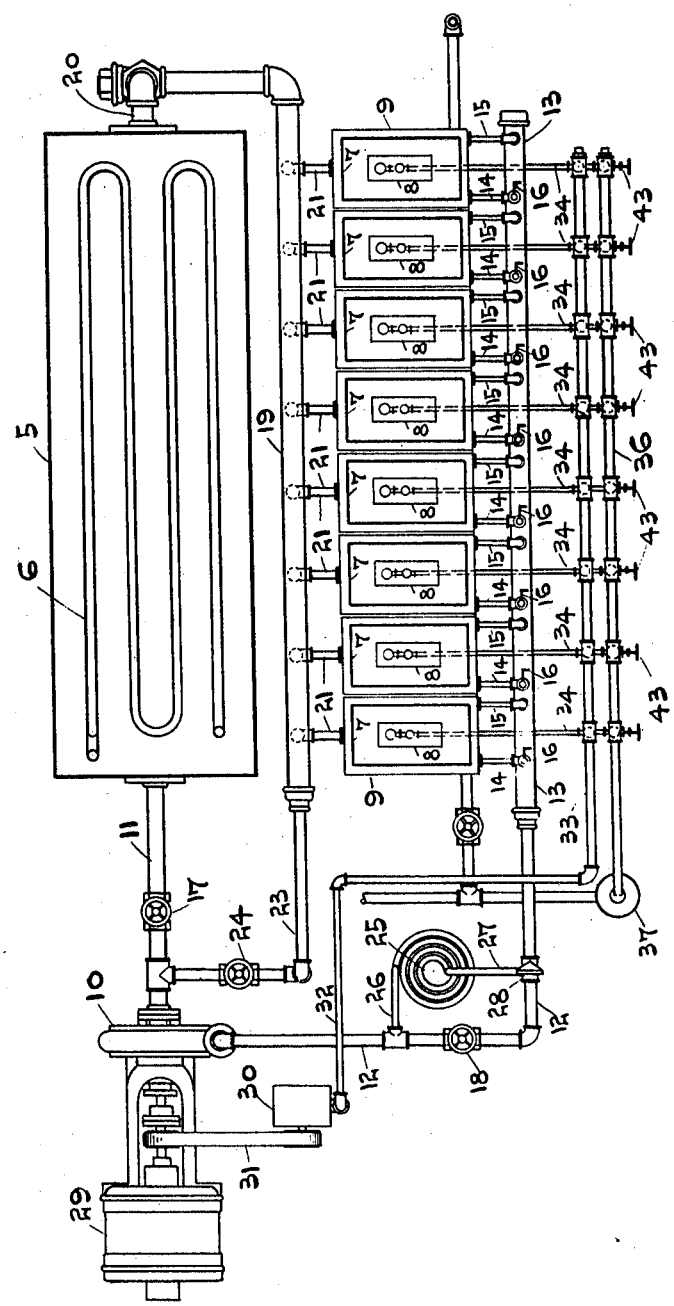

O. H. JEWELL.
APPARATUS FOR MAKING ARTIFICIAL ICE.
APPLICATION FILED JUNE 1, 1909.

1,004,653.

Patented Oct. 3, 1911.
3 SHEETS—SHEET 3.

WITNESSES
INVENTOR
Omar H. Jewell.
BY
his ATTORNEYS

UNITED STATES PATENT OFFICE.

OMAR H. JEWELL, OF CHICAGO, ILLINOIS, ASSIGNOR TO POLAR ICE MACHINE COMPANY, OF CHICAGO, ILLINOIS, A CORPORATION OF ILLINOIS.

APPARATUS FOR MAKING ARTIFICIAL ICE.

1,004,653.  Specification of Letters Patent.  Patented Oct. 3, 1911.

Application filed June 1, 1909. Serial No. 499,483.

*To all whom it may concern:*

Be it known that I, OMAR H. JEWELL, a citizen of the United States, residing at Chicago, in the county of Cook and State of Illinois, have invented certain new and useful Improvements in Apparatus for Making Artificial Ice, of which the following is a specification, reference being had to the accompanying drawings.

My invention relates to the manufacture of artificial ice, and has particularly to do with the harvesting of the ice after the freezing operation has been completed.

It has for its object to provide an improved apparatus by which the blocks or cakes of ice may be easily and quickly loosened from the cans in which they are frozen and at the same time tempered so that they will not crack or crumble materially when exposed to the atmosphere. I accomplish this object as illustrated in the drawings and as hereinafter described.

What I regard as new is set forth in the claims.

Figure 2:
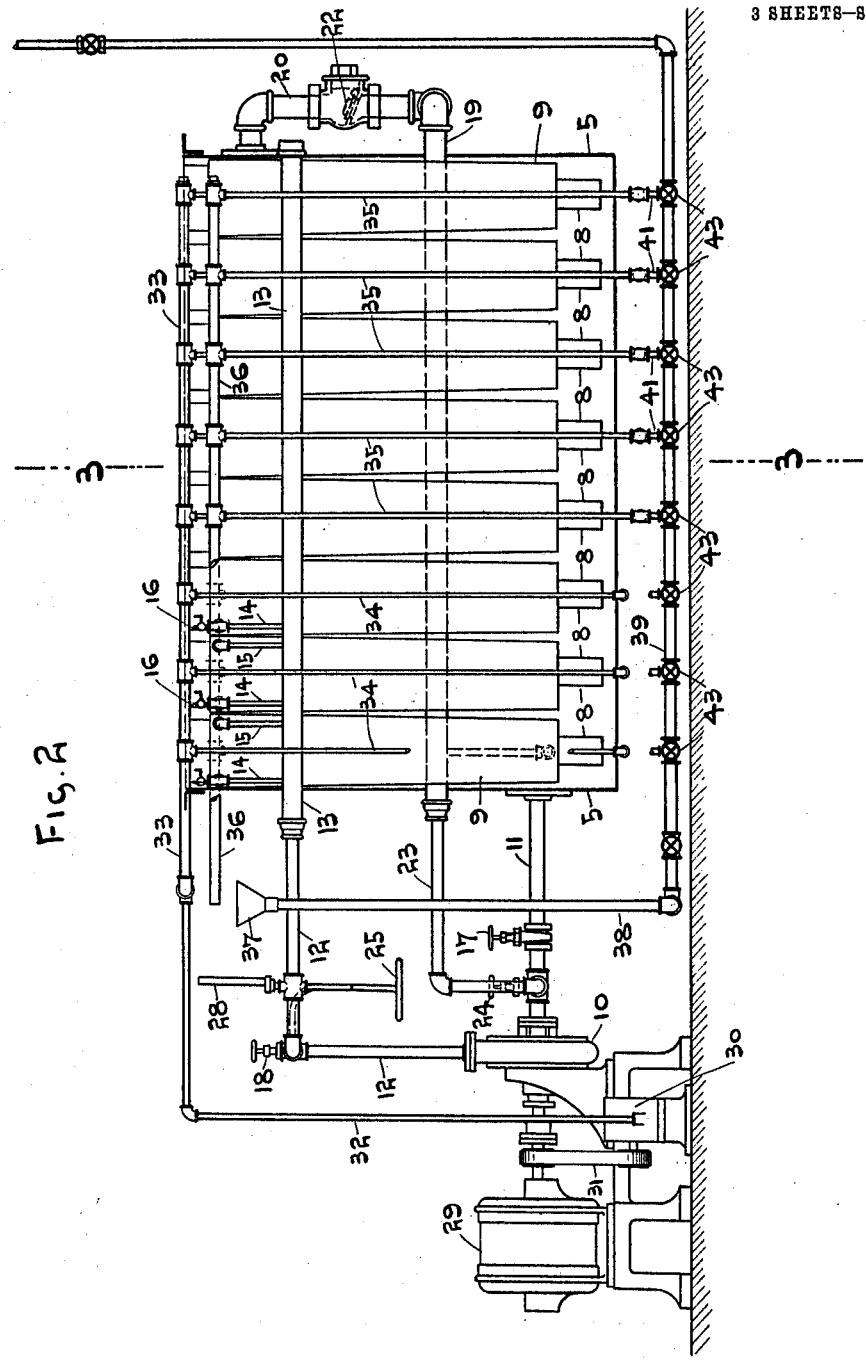
Figure 3:
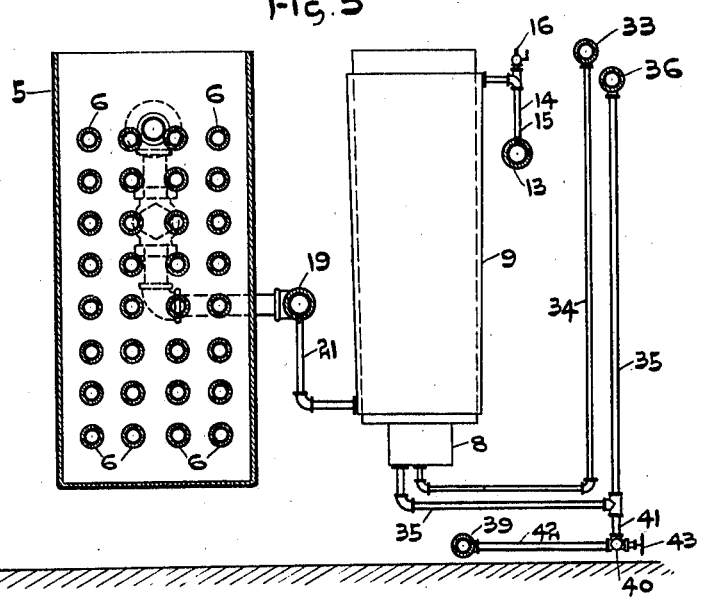
Figure 4:
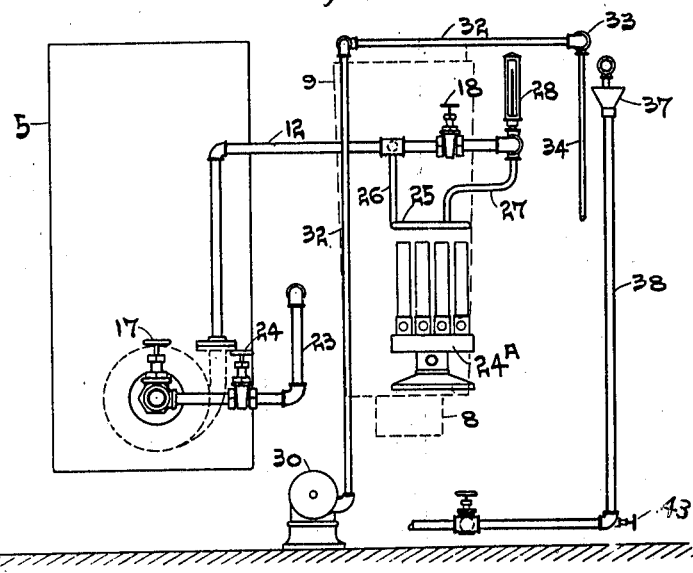

In the accompanying drawings, in which I have illustrated my improvements in connection with an apparatus for freezing water according to the method described in my pending application, Ser. No. 404,776, filed December 2, 1907,—Figure 1 is a plan view of the apparatus; Fig. 2 is a side elevation, some parts being broken away; Fig. 3 is a cross-section on line 3—3 of Fig. 2; and Fig. 4 is an end view, the motor and adjacent parts being omitted.

I shall now describe the embodiment of my invention illustrated, but I wish it to be understood that my improvements are not limited in their application to an apparatus constructed and arranged to manufacture ice according to the process described in my said pending application, as they may be applied to other types of apparatus. My invention is, however, peculiarly applicable to apparatus designed to freeze water at a low temperature, since it provides for tempering the ice as well as freeing it so that when removed from the container it is not damaged so as to injure its value as a commercial article, by exposure to the atmosphere.

Referring to the drawings,—5 indicates a tank adapted to contain brine, or other non-freezing liquid, which may be caused to circulate around the containers in which the water to be frozen is placed.

6 indicates a coil placed within the tank 5, through which ammonia, or other freezing medium, is caused to pass for cooling the brine. The coil 6 is supplied in any suitable way, it being understood that the brine in the tank 5 is maintained at a suitable temperature, as, for example, zero Fahrenheit.

7 indicates a series of containers or cans adapted to contain the water to be frozen. Said cans are preferably of the type shown and described in my pending application hereinbefore referred to, being provided at the bottom with a well or receptacle 8 which is exposed to the atmosphere and forms a non-freezing zone, the water in which remains unfrozen while the contents of the can 7 proper are frozen. Each of the cans 7 is surrounded by a jacket 9 extending from the bottom to near the top thereof, as shown in Fig. 3, from which it will be seen that the jackets 9 do not extend around the well or receptacle 8 below the bottoms of the cans. The space between the cans 7 and the jackets 9 forms a chamber through which the cold brine is caused to circulate for freezing the contents of the cans 7. For providing this circulation a centrifugal pump 10 is provided, which is connected by a pipe 11 with one end of the brine-tank 5 and is also connected by a pipe 12 with a header 13, which is connected with each of the can jackets 9 by two pipes 14—15, one of said pipes, as 14, being provided with a valve 16, as best shown in Fig. 1.

17 indicates a valve provided in the pipe 11, and 18 indicates a valve provided in the pipe 12.

19 indicates a return header, which is connected with the opposite end of the brine-tank 5 by a connecting pipe 20, as shown in Fig. 1, and is connected with the opposite ends of the can jackets 9 by a series of pipes 21. The pipe 20 is provided with a check-valve 22 shown in Fig. 2, which prevents reverse flow of brine therethrough.

23 indicates a pipe, which connects the return header 19 with the pipe 11 between the valve 17 and the pump 10, said pipe 23 being provided with a valve 24, as shown in Fig. 1.

It will be observed that by the construction described, when the valves 17 and 18 are opened, by operating the pump 10, brine from the tank 5 may be caused to flow to the header 13 and thence through the can jackets 9, thence through pipes 21 and the return header 19, and thence back to the brine tank. By shutting the valve 17 and opening the valve 24, the brine contained in the system of pipes described may be caused to circulate without returning to the brine tank. For use in connection with the latter arrangement I provide a heating appliance 24$^a$, which may be of any suitable description, such as a gas-burner shown in Fig. 4, which is placed under a coil 25 which is arranged as a by-pass in connection with the pipe 12, one end 26 of said coil being connected with the pipe 12 between the valve 18 and the pump 10, and the other end 27 of said coil being connected with the pipe 12 between the valve 18 and the header 13. By this construction a greater or less part of the brine in the pipes may be caused to pass through the coil 26 and be heated by the heater 24$^a$, the proportionate quantity passing through said coil being regulated by adjusting the valve 18.

28 indicates a thermometer placed at the juncture of the pipes 27 and 12 for indicating the temperature of the brine after it comes from the heating coil.

It will be evident from the foregoing description that when it is desired to harvest the ice formed in the cans 7, the valve 17 is closed, thereby cutting off the pump 10 from the brine tank 5. At this time the valves 24 and 18 are opened, so that the brine, heated to the desired temperature by the heater 24$^a$, is caused to circulate around the blocks of ice in the cans, thereby freeing them from the cans, at the same time tempering them so that when removed they are not injuriously affected by the atmospheric temperature. Ordinarily the brine is heated to a temperature of about 40° Fah. for harvesting and tempering purposes. The pump 10 is preferably operated by a directly-connected electric motor 29 shown in Fig. 1, but may be driven from any other suitable source of power.

In my improved process hereinbefore referred to, during the freezing operation, the water is caused to circulate by the introduction thereinto of air through the non-freezing zone described, and in the apparatus of my present application this feature is also shown, 30 indicating an air-pump driven by a belt 31 from the motor 29 and connected by a pipe 32 with a header 33, which is connected by a pipe 34 with the bottoms of the several wells or receptacles 8 at the bottoms of the tanks 7, as best shown in Figs. 1 and 3.

35 indicates pipes leading from the bottom of each of the several wells or receptacles 8, and extending up to a header 36 arranged at the level of the water in the several cans 7, said header being arranged to discharge into a funnel 37 at the upper end of a discharge pipe 38 which communicates with a waste-pipe 39. The several pipes 35 also connect with the waste-pipe 39 by means of a header 40 with which they are connected by stubs 41, the header 40 being connected with a waste-pipe 39 by branch-pipes 42, as shown in Fig. 3.

43 indicates valves for cutting off the pipes 35 and 41 from the header 40.

The purpose of the pipes 35—36 and their connections above described is to maintain a constant water level in the cans 7 by permitting enough water to escape, as freezing progresses, to maintain a constant level in the cans; also to provide for the automatic removal of the impure water from the can as soon as circulation ceases owing to the freezing up of the vertical passage through the mass of ice in the can, as described in the patent to William B. Bull, No. 948,131, dated February 1, 1910.

While I have illustrated an apparatus in which a plurality of cans are used, it will be understood that any desired number of cans may be employed, and in other respects also the apparatus may be varied so long as the essential features of my invention are retained, which are the provision of means by which a part of the brine, or other freezing medium employed, may be warmed and caused to circulate around the can or cans to free the ice from the container in which it is formed, and also to temper it; also the provision of means either having the construction described, or equivalent construction, for regulating the temperature of the brine and for controlling its use either as a freezing medium or as a harvesting medium.

That which I claim as my invention, and desire to secure by Letters Patent, is,—

1. An apparatus for making artificial ice, comprising a receptacle adapted to contain water to be frozen, a brine tank, means for causing brine from said tank to circulate around said receptacle, means for cutting out the brine tank and forming a harvesting circuit for maintaining a circulation of a portion of the brine around said receptacle for harvesting or tempering the ice, a by-pass in the harvesting circuit and means for warming the brine flowing through said by-pass.

2. An apparatus for making artificial ice, comprising a receptacle adapted to contain water to be frozen, a brine tank, a supply pipe for conducting brine from said tank to said receptacle, means for conducting the brine around said receptacle, a return pipe for conducting brine from said receptacle back to the brine tank, a pipe for conducting brine from said receptacle back to the supply pipe, valves for controlling the flow of brine through said pipes, a by-pass connected with said supply pipe, and means for warming the brine passing through said by-pass.

3. An apparatus for making artificial ice, comprising a receptacle adapted to contain water to be frozen, a brine tank, a supply pipe for conducting brine from said tank to said receptacle, means for conducting the brine around said receptacle, a return pipe for conducting brine from said receptacle back to the brine tank, a pipe for conducting brine from said receptacle back to the supply pipe, valves for controlling the flow of brine through said pipes, a by-pass connected with said supply pipe, means for warming the brine passing through said by-pass, and valves for controlling the flow of brine through said by-pass.

OMAR H. JEWELL.

Witnesses:
JOHN L. JACKSON,
MINNIE A. HUNTER.

Copies of this patent may be obtained for five cents each, by addressing the "Commissioner of Patents, Washington, D. C."